United States Patent
Watanabe

[11] 3,787,995
[45] Jan. 29, 1974

[54] OUTRIGGER LINE RELEASE

[76] Inventor: Mike Fukuichi Watanabe, P.O. Box 536, Paia, Hawaii

[22] Filed: June 22, 1972

[21] Appl. No.: 265,252

[52] U.S. Cl. .............................................. 43/43.12
[51] Int. Cl. ........................................... A01k 91/00
[58] Field of Search............. 43/42.04, 43.11, 43.12; 24/115 F, 115 K, 123 H, 201 SL, 201 SP; 287/DIG. 3

[56] References Cited
UNITED STATES PATENTS

| | | | |
|---|---|---|---|
| 2,170,594 | 8/1939 | Nicholson | 43/43.12 |
| 3,193,964 | 7/1965 | Hurst | 43/43.12 |
| 3,357,126 | 12/1967 | Klieves | 43/43.12 |

Primary Examiner—Louis G. Mancene
Assistant Examiner—Robert F. Cutting
Attorney, Agent, or Firm—

[57] ABSTRACT

A fishing line holding device to support a line from the end of an outrigger pole while permitting easy adjustment of the line length. The device has a bifurcated body with a frangible member such as a matchstick used to hold the line within the bifurcation.

9 Claims, 3 Drawing Figures

PATENTED JAN 29 1974  3,787,995

TO LURE

TO OUTRIGGER

TO ROD & REEL

OUTRIGGER LINE RELEASE

This invention relates to a fishing device and, more particularly, to a fishing line holder for securing a fishing line at the end of an outrigger pole to enable its quick release in case of a predetermined strain on the line such as a fish strike. Many boats engaged in trolling for fish utilize an outrigger pole, that is, a long pole which extends from the hull above and outwards so that a line can run up from a rod and reel to be supported from the end of the pole so as to spread it away from the boat so that the drag lure will play in the outer margin of the boat's wake. Such an outrigger pole provides room for additional trolling lines as well as keeping the line clear of the boat hull.

It is very important to be able to quickly release the line when a fish strikes and various devices have been utilized to accomplish this, for example, the clothes-pin like device of Klieves U.S. Pat. No. 3,357,126. However, such a device does not permit ready adjustment of the length of the line and thus other, more complicated, mechanical devices have been utilized such as those disclosed in the Smith U.S. Pat. No. 2,730,830 or Hurst U.S. Pat. No. 3,193,964.

It is an object of the present invention to provide an outrigger fishing line guide which has no moving parts, is simple and economical to construct and, at the same time, permits both adjustment of the line length and quick release of the line when a fish strikes.

These and other advantages will become more apparent from the following description and drawings which are given by way of example only in order to describe a preferred embodiment of the invention, wherein.

Figure 1:
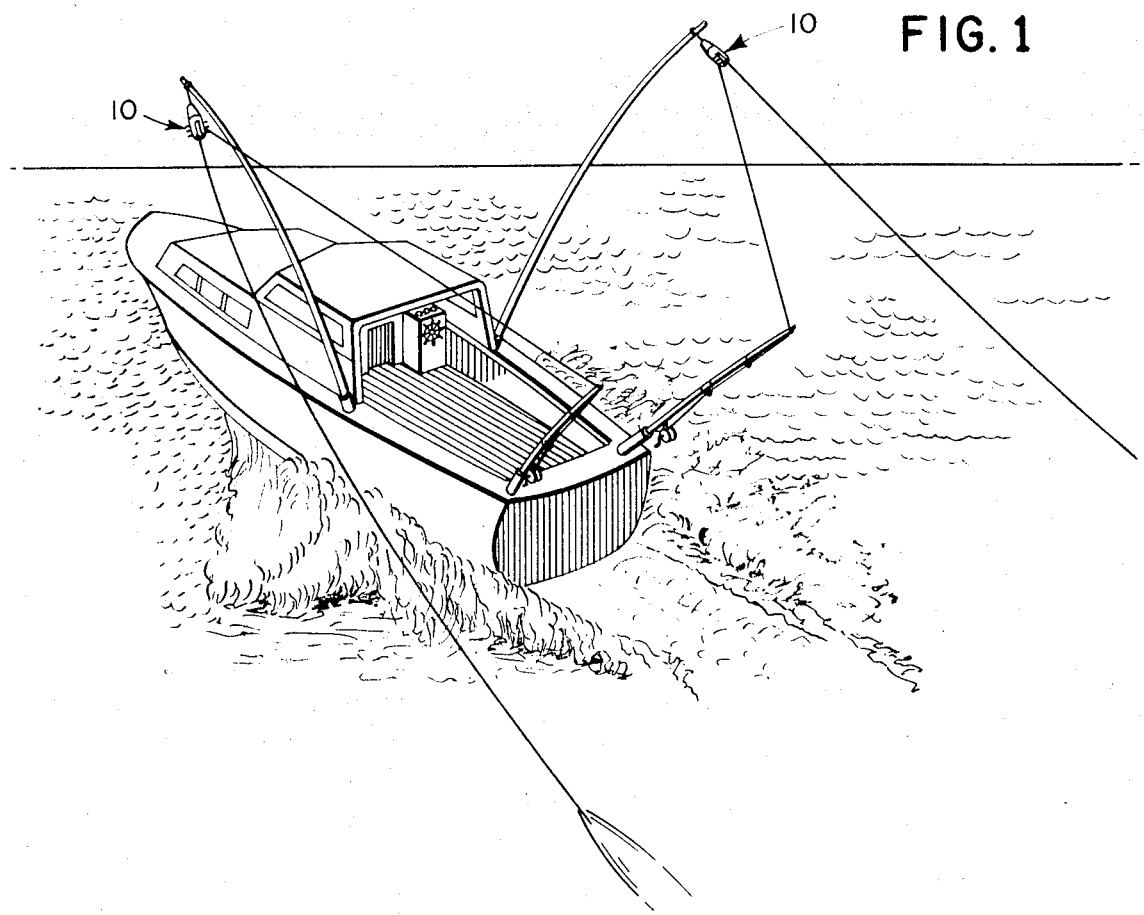
FIG. 1 is a perspective view of a boat having two outrigger poles equipped with the present invention.

In FIG. 1 it can be seen that a fishing line leads from a rod and reel up through the guide 10 of this invention and then down to a lure which is being trolled through the water.

Figure 2:
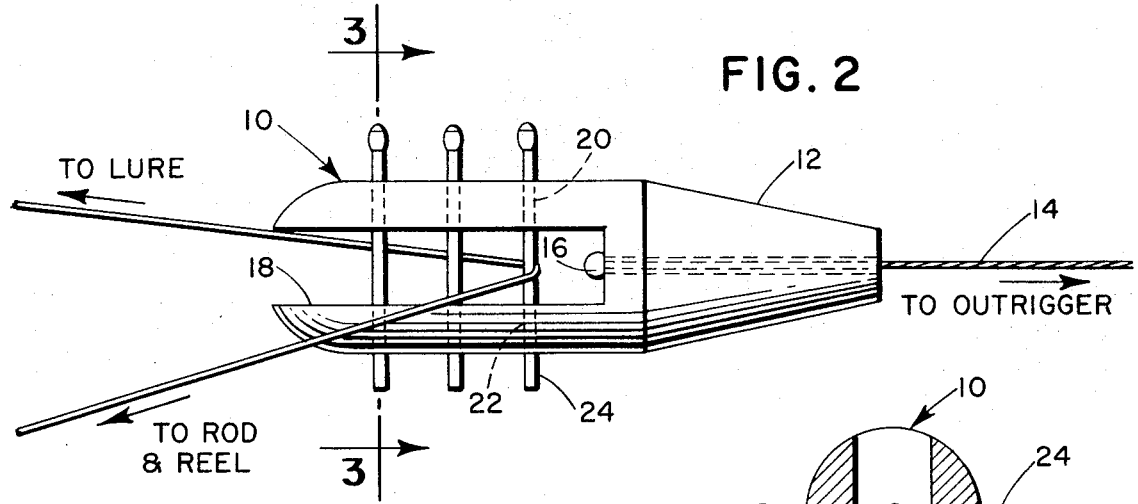
FIG. 2 is a front elevational view of the invention with a fishing line in place.

Referring now to FIG. 2, it can be seen that the device is preferably a cylindrically shaped body having a tapered portion 12 which has means to pivotally and rotatably secure it to the outrigger pole such as a line or cable 14 which passes through a central opening of the body and has a tip 16 secured to the line or cable to hold it in place. The device also has a bifurcated portion 18 which has at least one pair 20 and 22 of axially aligned holes into which an elongated frangible member 24 can be detachably inserted.

Figure 3:
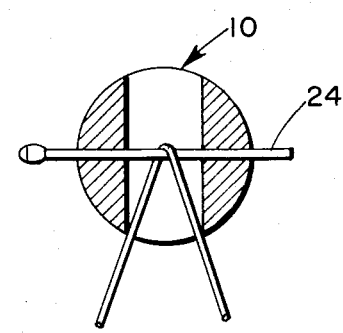
FIG. 3 is a sectional view along line 3—3 of FIG. 2.

The body could be made out of wood, plastic or metal, preferably of molded plastic so as to be least affected by salt water spray and other natural elements. The elongated frangible member should be of a material which is readily and economically available and which will readily break when the strain of a fish strike is put upon the line. Ordinary wooden matchsticks have been illustrated in FIGS. 2 and 3 with a Lancer match being found preferable. Other such frangible articles, such as wooden toothpicks or pieces of soft wood dowel of approximately the same strength could also be used. For the sake of precisely describing a working embodiment, the Lancer match (a safety match manufactured in Sweden and available in the U.S.A.) has a stick of soft wood such as pine with a square cross section measuring about 3/32 inch across. As previously stated, any match stick of similar size could be used.

Since the width of the bifurcated portion 18 is less than the length of a match stick, after breakage the same matchstick could be used again by pushing the unbroken portion further through holes 20 and 22.

Frangible member 24 is spaced a sufficient distance from the end of the bifurcated portion so as to enable easy threading of a fishing line through the body and to enable that line to be easily varied in length as particular trolling conditions might necessitate.

If the lure being used at the end of the line is small, then one match stick has been found to be sufficient. However, if a large lure is used, it is preferable to have two or three matchsticks in series as shown in FIG. 2 because, after a certain amount of usage and rubbing by the line, a single matchstick may break more easily than desired but there would still be at least one other matchstick left, thereby avoiding the need to reset the line. It is thus convenient to have three sticks in series as illustrated in FIG. 2, particularly for long trolls.

What is claimed is:

1. A fishing line holding device which permits ready variation of the line length comprising:
   a body member having means at one side to attach it to a support,
   a bifurcated portion at the opposite side of said body,
   at least one frangible member extending across said bifurcated portion and spaced from said body to permit passage of a fishing line between the member and the body so that a predetermined strain on the line will break the frangible member and release the line.

2. The device of claim 1 in which the frangible member is detachably secured in a pair of holes, one in each side of the bifurcated portion.

3. The device of claim 1 having at least two frangible members placed so that a fishing line is supported by only one member at a time.

4. The device of claim 1 in which the attachment means permits the body to pivot and rotate in relation to its support.

5. The device of claim 1 in which the frangible member is a wooden matchstick.

6. An outrigger fishing line holding device which permits ready variation of the line length comprising:
   a. an elongated body member having means at one end to pivotally attach it to an outrigger pole;
   b. a bifurcated portion at the other end of the body;
   c. at least one elongated frangible member detachably secured across said bifurcated portion and spaced therefrom to permit easy sliding movement of a fishing line between the member and the body so that the line is supported by the frangible member and a predetermined strain on the line will break the frangible member and release the line.

7. The device of claim 6 in which the frangible member is positioned in a pair of axially aligned holes, one in each side of the bifurcated portion.

8. The device of claim 6 having at least two frangible members placed so that a fishing line is supported by only one member at a time.

9. The device of claim 6 in which the frangible member is a wooden matchstick.